Sept. 24, 1968  G. EPSTEIN ETAL  3,403,325
APPARATUS FOR AND METHOD OF MEASURING THERMAL STRESS
BY NUCLEAR RESONANCE
Filed Sept. 17, 1964  5 Sheets-Sheet 1
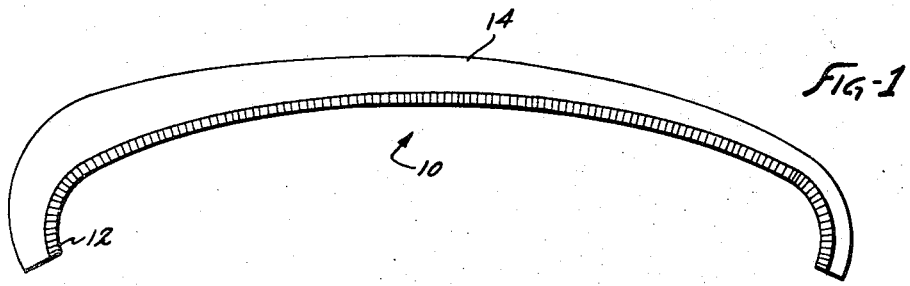
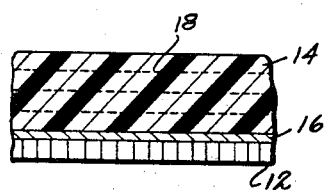
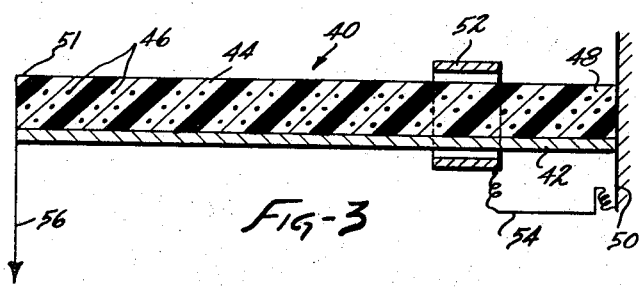
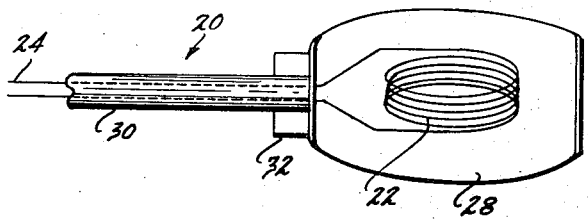
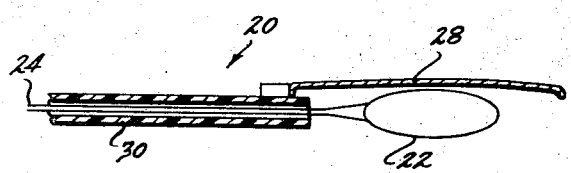
INVENTORS
GEORGE EPSTEIN
ROBERT R. HEWITT
BERNARD MAZELSKY
BY
Herzig & Walsh
ATTORNEYS Sept. 24, 1968  G. EPSTEIN ET AL  3,403,325
APPARATUS FOR AND METHOD OF MEASURING THERMAL STRESS
BY NUCLEAR RESONANCE
Filed Sept. 17, 1964  5 Sheets-Sheet 2
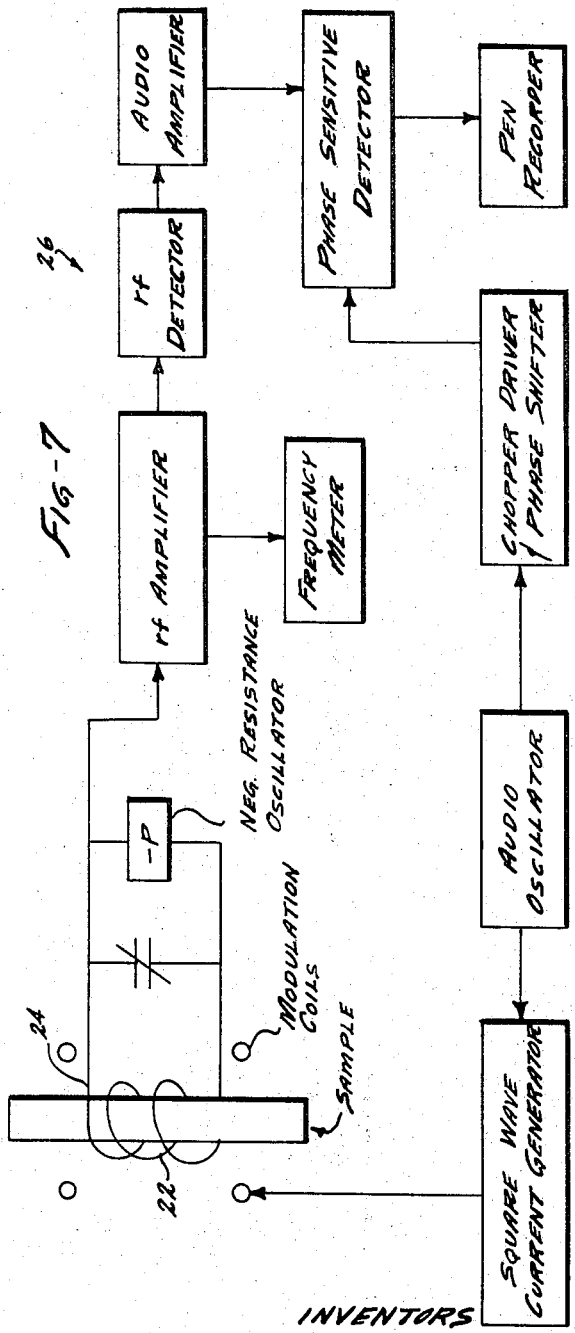
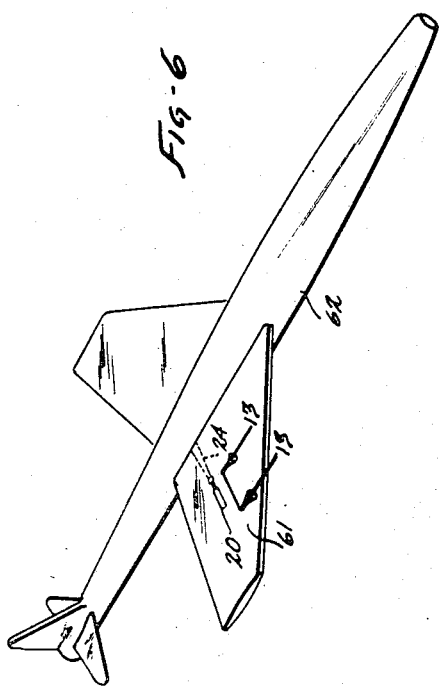
INVENTORS
GEORGE EPSTEIN
ROBERT R. HEWITT
BERNARD MAZELSKY
BY
Herzig & Walsh
ATTORNEYS INVENTORS
GEORGE EPSTEIN
ROBERT R. HEWITT
BERNARD MAZELSKY
BY
Herzig + Walsh
ATTORNEYS Sept. 24, 1968          G. EPSTEIN ET AL          3,403,325
APPARATUS FOR AND METHOD OF MEASURING THERMAL STRESS
BY NUCLEAR RESONANCE Filed Sept. 17, 1964                               5 Sheets-Sheet 4

INVENTORS
GEORGE EPSTEIN
ROBERT R. HEWITT
BERNARD MAZELSKY

BY Herzig & Walsh
ATTORNEYS

Sept. 24, 1968   G. EPSTEIN ETAL   3,403,325
APPARATUS FOR AND METHOD OF MEASURING THERMAL STRESS
BY NUCLEAR RESONANCE
Filed Sept. 17, 1964   5 Sheets-Sheet 5

INVENTORS
GEORGE EPSTEIN
ROBERT R. HEWITT
BERNARD MAZELSKY
BY
Herzig & Walsh
ATTORNEYS

United States Patent Office 3,403,325
Patented Sept. 24, 1968

3,403,325
APPARATUS FOR AND METHOD OF MEASURING THERMAL STRESS BY NUCLEAR RESONANCE
George Epstein, Los Angeles, Robert R. Hewitt, Riverside, and Bernard Mazelsky, West Covina, Calif., assignors to ARA, Inc. (Aerospace Research Associates, Inc.), West Covina, Calif., a corporation of California
Filed Sept. 17, 1964, Ser. No. 397,077
7 Claims. (Cl. 324—.5)

The present invention relates to apparatus for and method of measuring thermal stress by nuclear resonance, and more particularly to apparatus for and a method of making temperature and stress measurements by utilizing the phenomenon that certain nuclei have the ability to absorb radio-frequency energy, the nature of which is sensitive to temperature and stress. The present invention also relates to a new and useful composition of matter containing such nuclei.

The accurate measurement of stress and temperature in critical structures subjected to intense heat fluxes and mechanical loadings encountered in many applications, such as aerospace applications, has long been a problem.

Instruments for measuring stress and temperature within composite structures are known. Although generally satisfactory, such instruments do have certain disadvantages.

One disadvantage resides in the fact that they are inadequate for the measurement and study of internal stresses and thermal strains in pressure vessels, space vehicles, cryogenic tankage, heat shields, and the like.

Another disadvantage resides in the fact that such instruments do not lend themselves readily to nondestructive applications.

Yet another disadvantage resides in the fact that such instruments do not lend themselves to being incorporated in a vehicle for continuous monitoring of critical structures.

It has also been a problem for some time to accurately measure the wall thicknesses of certain nonmetallic structures such as filament-wound pressure vessels and rocket motor cases. In addition, the measurement of the wall thickness of certain multi-layer composite structures has been a problem.

Another prior art problem has been to accurately measure changes in the state of stress and temperature on the surface of a structure, making the nondestructive inspection of critical structures, including metallic structures, exceedingly difficult.

In view of the foregoing factors and conditions characteristic of apparatus for and methods of measuring temperature and stress, it is a primary object of the present invention to provide a new and useful apparatus for and method of measuring thermal stress not subject to the disadvantages enumerated above and having means especially designed for measuring temperature and stress by nuclear resonance efficiently, safely, and expeditiously.

Another object of the present invention is to provide a new and useful method of measuring thermal stress in nonmetallic structures.

Yet another object of the present invention is to provide new and useful apparatus for the nondestructive inspection of critical structures.

A further object of the present invention is to provide new and useful apparatus for and method of measuring the wall thickness of nonmetallic structures.

A still further object of the present invention is to provide a new and useful apparatus for and method of continuously monitoring the structural integrity and temperature of critical structures.

Another object of the present invention is to provide a new and useful composition of matter which includes temperature and stress sensitive tracer nuclei.

According to the present invention, molecular species having nuclei that are capable of absorbing radio-frequency energy and are sensitive to changes in temperature and stress are incorporated as tracers for use as localized sensors of temperature and stress in structures to be tested.

A suitable tracer or sensor may be incorporated in those regions of a particular structure at which stress and/or temperature profiles are desired. Nuclear quadrupole resonance (NQR) measurement techniques are then employed to determine stresses and temperatures. Such determinations may be made either simultaneously or separately.

The underlying principle of the method of the present invention is the ability of certain nuclei to absorb radio-frequency energy, the nature of which is sensitive to temperature and stress.

Apparatus for this type of measurement, while not widely in use, has been developed and consists of relatively standard electrical components. The apparatus of the present invention comprises a conventional NQR spectrometer having a probe of the present invention in combination with a structural member to continuously monitor temperature and stress in a predetermined portion of the structural member.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which like reference characters refer to like elements in the several views.

In the drawings:
FIGURE 1 is an elevational view of a heat shield containing a composition of matter of the present invention which can be tested in accordance with the method of the present invention using apparatus of the present invention;

FIGURE 2 is an enlarged, partial cross-sectional view of the heat shield of FIGURE 1;

FIGURE 3 is an elevational view of a beam structure to be tested in accordance with the present invention;

FIGURE 4 is a bottom view of a probe which may be used in practicing the method of the present invention and constitutes a portion of the apparatus of the invention;

FIGURE 5 is an elevational view of the probe of FIGURE 4;

FIGURE 6 is a perspective view of an aircraft incorporating the apparatus of the invention;

FIGURE 7 is a block diagram of a spectrometer which may be used with the probe of the invention to carry out the method of the present invention;

Figure 8:
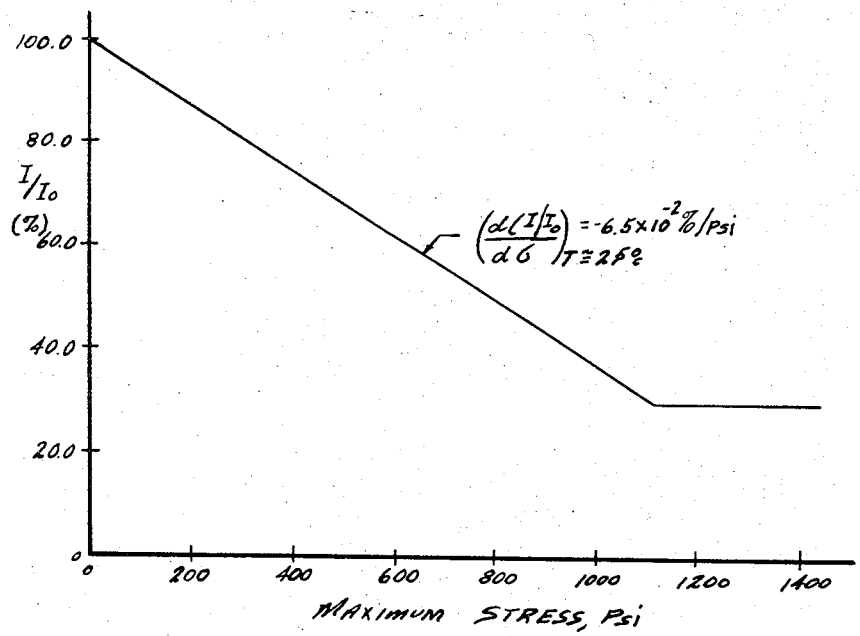
FIGURES 8–12 are NQR response curves which may be used in carrying out the method of the present invention.

Referring again to the drawings, and more particularly to FIGURES 1 and 2, a nonmetallic re-entry heat shield, generally designated 10, includes a honeycomb-sandwich shell substructure 12 to which is bonded an ablative thermal protection layer 14 by an adhesive 16. The thickness of the ablator 14 may vary with location, depending upon the thermal protection requirements as influenced by the flight parameters. At the edges of the substructure 12, lateral and rotational motion is opposed by edge restraints (not shown) which result in a complex stress distribution within the ablator 14 and the adhesive bond 16. Temperature distribution throughout the ablator 14 and the adhesive bond 16 is represented by a steep thermal gradient which varies with time and location in the heat shield 10. A stress and temperature sensitive tracer or sensor 18 is incorporated in the heat shield 10 in those regions at which stress and temperature profiles are desired. The tracer 18 may be added as a separate element or the material of which the ablator 14 and adhesive bond 16 is made may already contain a tracer material, as will be explained hereinafter in detail.

A suitable probe, such as the one shown at 20 in FIGURES 4 and 5, may then be passed over the heat shield 10 in the areas to be investigated. The probe 20 includes a coil 22 which may be connected through leads 24 to a suitable nuclear quadrupole resonance spectrometer like the one shown diagrammatically at 26 in FIGURE 7. A conductive metallic reflector or hood 28 is mounted above the coil 22 to serve as an R-F reflective mirror and energy concentrator. The hood 28 is connected to an insulated handle 30 by a mounting block 32.

Tracers, like the tracer 18, have the facility for behaving as localized sensors of temperature and stress which can be measured by the absorption of radio-frequency energy through the detection of changes in nuclear conditions as a direct result of temperature and stress environments. Any nuclear system with an observable NQR response may be used as a sensor. Observable response is obtained from nuclei having nuclear magnetic moments and nuclear quadrupole moments. This requires a nuclear spin, I, greater than one-half. In addition, the crystal, molecule or ion should have a noncubic electric field environment at the nuclear sensor site. The measurements made are of an energy proportional to the product of the nuclear electric quadruple moment and the electric field gradient at the site of the nucleus. The NQR spectrometer 26 makes these measurements and includes the components identified in the block diagrams in FIGURE 7. With the exception of the probe 22, these components are old in the art.

The temperature dependence and stress dependence observed are related to the electric field gradient. The variations in this field gradient may be expressed as variations in its three principal components, $\phi_{xx}$, $\phi_{yy}$ and $\phi_{zz}$. Variations in $\phi_{zz}$ are directly proportional to the energy observed. Variations in $\phi_{xx}$ and $\phi_{yy}$ affect the asymmetry, $\eta$, of the electric field gradient tensor defined by $$\eta = \frac{\phi_{xx} - \phi_{yy}}{\phi_{zz}}$$

and lies in the range of 0 to 1.

The effect of $\eta$ on the quadrupole energies and hence the NQR frequencies are not generally expressible in closed form, but tables of the effect of $\eta$ on the NQR frequency have been published (see M. H. Cohen, Phys. Rev., 96, 1278 (1954). For the special case of $I=\frac{3}{2}$ the NQR frequency may be expressed in closed form, and this will be used to illustrate the frequency dependence from variations in the electric field gradient. $\gamma$ is the NQR frequency, $e$ is the electronic charge, $h$ is Planck's constant and $\delta$ is any spatial parameter.

$$\gamma = \frac{\frac{1}{2} e^2 \phi_{zz}}{h} \left(1 + \frac{\eta^2}{3}\right)^{1/2}$$

$$\frac{d\lambda}{d\delta} = \frac{e^2}{2h} \left(1 + \frac{\eta^2}{3}\right)^{1/2} \frac{\partial \phi_{zz}}{\partial \delta} + \frac{e^2 \phi_{zz}}{6h} \frac{\eta}{\left(1 + \frac{\eta^2}{3}\right)^{1/2}} \frac{\partial \eta}{\partial \delta}$$

It is seen that $\gamma$ may change due to variations in $\phi_{zz}$ as shown in the first term of the above expression or due to variations in $\eta$ as shown in the second term. Temperature affects the spatial parameters by changing the interionic or atomic spacings and by changing the thermal motions that provide averaging contributions to the observed spatial values. Stress changes the frequency by two mechanisms that may be separated as (1) isotropic spatial displacement, and (2) anisotropic spatial displacement. The isotropic effect changes $\phi_{zz}$ essentially as the (volume)$^{-1}$; this is usually a small effect. The anistotropic displacement may affect $\phi_{zz}$ in the charge sum of $$\int (3 \cos^2 \phi - 1) \, dv$$

where $\phi$ is the angle between the vector location of an element of charge and the $\phi_{zz}$ axis. For some situations, very small anisotropic shifts can cause extremely large changes in $\eta$; and hence, for compounds where stresses set up anisotropic strains, a sensitive sensor of stress is available. The frequency dependence of the stress sensor is exhibited in the second term of the above expression.

The NQR sensor is present as a polycrystalline powder, i.e., a collection of very small crystals with random orientation. Concerning the collective effects on the NQR response in a small volume, the temperature effect will be the same on all crystallites resulting in a uniform shift of NQR frequency. Stress is a second rank tensor and the strain induced in the crystallite by a given stress will depend upon the relative orientation of the crystal geometry. The result of the stress will be a distribution of frequency shifts from the random orientation of the crystallites. This results in a "broadening" of the resonance with the larger frequency deviations disappearing in the noise background. The experimental effect of this anisotropic strain of random crystal orientation is to reduce the intensity of the observed resonance. If a sufficient signal-to-noise ratio is present, a broadening of the resonance can also be observed. It is possible then to use a single NQR species as a simultaneous sensor of temperature (from frequency shift) and stress (from intensity loss and/or line broadening). It is also possible to use two different nuclear species, one that is chosen for its temperature dependence properties and one that is chosen for its anisotropic strain dependence. Preferably, the sensors comprise substances with high isotopic abundance, large nuclear magnetic moments and convenient frequencies to optimize the signal-to-noise ratios. It is also preferred to use a nuclear spin $I>3/2$ to provide good sensitivity to anisotropic strain.

The naturally occurring isotopes that can have a nuclear quadrupole interaction are: $^{2}$D, $^{6}$Li, $^{7}$Li, $^{9}$Be, $^{10}$B, $^{11}$B, $^{14}$N, $^{16}$N, $^{17}$O, $^{21}$Ne, $^{22}$Na, $^{23}$Na, $^{24}$Na, $^{25}$Mg, $^{27}$Al, $^{33}$S, $^{35}$S, $^{35}$Cl, $^{36}$Cl, $^{37}$Cl, $^{39}$K, $^{40}$K, $^{41}$K, $^{45}$Sc, $^{47}$Ti, $^{49}$Ti, $^{51}$V, $^{53}$Cr, $^{55}$Mn, $^{59}$Co, $^{63}$Cu, $^{65}$Cu, $^{67}$Zn, $^{69}$Ga, $^{71}$Ga, $^{73}$Ge, $^{57}$As, $^{79}$Br, $^{81}$Br, $^{83}$Kr, $^{85}$Rb, $^{86}$Rb, $^{87}$Sr, $^{91}$Zr, $^{93}$Nb, $^{95}$Mo, $^{97}$Mo, $^{99}$Tc, $^{99}$Ru, $^{101}$Ru, $^{105}$Pd, $^{111}$In, $^{113}$In, $^{114}$In, $^{115}$In, $^{111}$Sn, $^{121}$Sb, $^{123}$Sb, $^{127}$I, $^{129}$I, $^{133}$Cs, $^{134}$Cs, $^{135}$Cs, $^{137}$Cs, $^{135}$Ba, $^{137}$Ba, $^{139}$La, $^{141}$Pr, $^{143}$Nd, $^{145}$Nd, $^{147}$Sm, $^{149}$Sm, $^{151}$Eu, $^{153}$Ei, $^{155}$Gd, $^{157}$Gd, $^{159}$Tb, $^{161}$Dy, $^{163}$Dy, $^{165}$Ho, $^{167}$Er, $^{173}$Yb, $^{175}$Lu, $^{176}$Lu, $^{177}$Hf, $^{179}$Hf, $^{181}$Ta, $^{185}$Re, $^{187}$Re, $^{187}$Os, $^{191}$Ir, $^{193}$Ir, $^{197}$Au, $^{201}$Hg, $^{209}$Bi, $^{227}$Ac, $^{231}$Pa, $^{235}$U, $^{237}$Np. Chemicals containing these isotopes may thus be employed for temperature and stress measurements using the method of the present invention.

Examples of this sensor technique will now be described.

*Example 1*

As shown in FIGURE 3 a structural member 40 includes a substrate 42 comprising an 0.05-inch-thick strip of type 347 stainless steel to which is bonded a suitable plastic member 44, such as epoxy adhesive No. J-1156/E-30, sold by the Armstrong Cork Company. The structural member 40 is designed so that when loaded in flexure as a cantilever beam, the neutral axis will be approximately at the interface between the substrate 42 and the plastic member 44. This subjects the plastic member 44 to pure tensile and compressive stresses throughout its thickness. The plastic member 44 includes a sensor or tracer 46 comprising $BiCl_3$.

The structural member 40 was prepared by mixing approximately 70% by volume of the aforementioned epoxy adhesive with approximately 30% by volume of reagent-grade $BiCl_3$ and casting the resulting mixture in the form of rods integrally bonded to the substrate 42. These were gelled at room temperature for approximately 24 hours and then cured overnight at a moderate temperature of 120–140 degrees F.

One end 48 was then anchored to a suitable fixture, indicated by the numeral 50, and the other end 51 of the member 40 was then slidably engaged by a coil 52 which was connected to a spectrometer of the type shown diagrammatically in FIGURE 7. The spectrometer included an R-F oscillator having a 0.1 volt sensitivity. The resulting signal-to-noise ratio was approximately 4/1. The signal-to-noise ratio was improved by grounding the housing of the coil 52 to the support 50 by a lead 54.

Stress was then applied to the member 40 in stages by suspending weight 56 from the end 51 with a moment arm to the center of the coil 52. The change in band width on the spectroscope was noted for each stage and the curve shown in FIGURE 8 was plotted with the relative amplitude of the NQR absorption curve, $I/I_0$ vs. maximum stress, where $I_0$ is the height (amplitude) of the 0-stress response and $I$ is the amplitude of the NQR response curve at the corresponding stress level.

*Example 2*

Another structural member 40, which was prepared in the manner discussed above in connection with Example 1, was mounted to provide compressive loading in stages from 0 to 1400 p.s.i.

Figure 9:
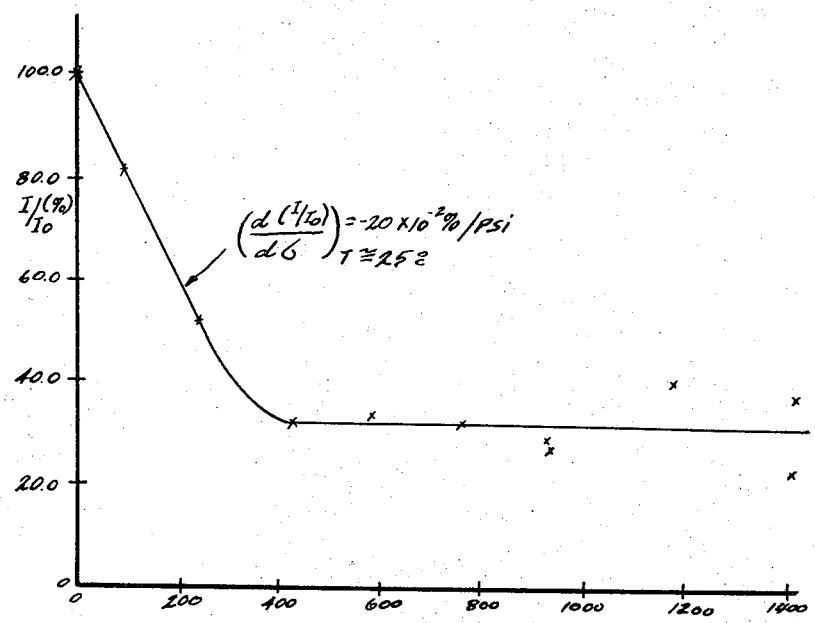

The NQR stress response was measured at each stage. Change in band width was again plotted against stress. This resulted in the curve shown in FIGURE 9.

*Example 3*

An epoxy plastic member 44 was prepared as in Example 1, but it was not bonded to a stainless steel substrate.

Thermocouples were connected to the member 44 to record temperatures, and the member 44 was subjected to temperature increases by increments from 88.5 to 172 degrees F. The coil 52 was employed to measure the nuclear resonance frequency at each temperature. Resonance frequency was then plotted against temperature to form the cure shown in FIGURE 10.

*Example 4*

A structural member was prepared by preparing a mixture containing approximately 70% by volume of the aforementioned epoxy plastic and approximately 30% by volume of reagent-grade cuprous oxide ($Cu_2O$). This mixture was cast in the form of a rod and the casting was integrally bonded to a type 347 stainless steel substrate. This was gelled at room temperature for approximately 24 hours and then cured overnight at a moderate temperature of 120–140 degrees F. The structural member was then mounted to provide compressive loadings in stages. The NQR response to applied stress was recorded from a spectrometer having a 0.1 volt oscillator sensitivity level. The resulting signal-to-noise ratio was 30/1. The curve shown in FIGURE 11 was prepared by plotting resonant frequency against stress. Both the resonant frequency, $\gamma_0$ and $\Delta\gamma_0$, the change in resonant frequency from the unstressed condition, are shown as a function of the maximum composite compressive stress that was applied. The curve indicates that an essentially linear relationship was obtained from 0 to 1700 p.s.i. for the maximum compressive stress. At higher loadings, a yielding of the test specimen was noted to occur and the resonant frequency shifted in the reverse direction. The initial slope of this curve is $2.2 \times 10^{-3}$ kc./p.s.i. This compares favorably with the $2.45 \times 10^{-3}$ kc./p.s.i. which was previously obtained for pure cuprous oxide under hydrostatic pressure as noted in Phys. Rev., 104, 1364 (1956). Thus, it will be apparent to those skilled in the art that one can readily determine the amount of stress in a given structure by measuring the resonant frequency of a $Cu_2O$ tracer material contained therein to obtain an NQR response which then can be converted to stress by referring to the curve shown in FIGURE 10 or to the cited literature.

*Example 5*

Figure 12:
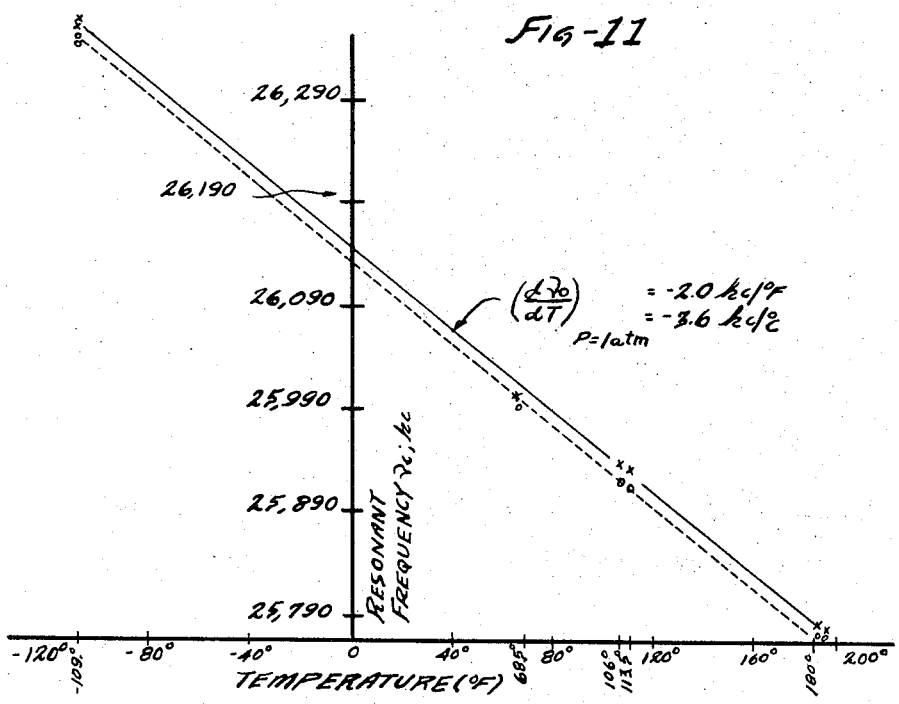

A plastic member of the type used in Example 4 was prepared without the steel substrate. Thermocouples were then connected to the plastic member to record the temperature thereof. The member was then subjected to temperatures ranging from −40 to 180 degrees F. The resonance frequency was measured at each temperature reading and the resonance frequency was plotted against temperature to form the curve shown in FIGURE 12. The slope of this curve, −3.6 kc./degree C., is in approximate agreement with the "theoretical" value for pure $Cu_2O$, i.e., −3.22 kc./degree C., published in the Phys. Rev., 104, 1364 (1956).

The required tracer concentrations may be calculated. It is known that to develop an adequate response, a minimum of $10^{21}$ nuclei of the NQR-sensitive molecules must be contained within the RF field. This corresponds to $(1.67 \times 10^{-3})/n$ moles:

$$\frac{10^{21} \text{ nuclei}}{(n \text{ nuclei/molecule})(6 \times 10^{23} \text{ molecules/mole})} = \frac{1}{n} \cdot (1.67 \times 10^{-3}) \text{ moles}$$

where $6 \times 10^{23}$ is Avogadro's number and $n$ is the number of NQR-sensitive nuclei per molecule.

The required concentration, R.C. (percent by volume), may then be calculated from $$\text{R.C.} = \frac{(1.67 \times 10^{-3})M}{\rho V n} \times 100$$

where $M$=molecular weight of tracer, $\rho$=density, and $V$=volume of the sample within the RF field.

By way of illustration, consider $Cu_2O$ and $BiCl_3$, the tracer elements employed in the preceding examples.

For $Cu_2O$ where $M=143$, $\rho=6.0$ gm./Cm.$^3 \times 16.4$ cm.$^3$/in.$^3$, and $n=2$, the required concentration is given:

$$(\text{R.C.})_{Cu_2O} = \frac{(1.67 \times 10^{-3}) \cdot (143)}{(6.0 \times 16.4) V (2)} \times 100$$

$$= \frac{0.122\%}{V} \text{ by volume}$$

where $V$ is in cu. in. Thus, for one-cubic-inch "probe volume," the $Cu_2O$ tracer need only be 0.122% of the volume of the nonmetallic structure being measured.

$$(\text{R.C.})_{BiCl_3} = \frac{(1.67 \times 10^{-3}) \cdot (315)}{(4.75 \times 16.4) V} \times 100$$

$$= \frac{0.676\%}{V} \text{ by volume}$$

Thus, for one-cubic-inch "probe volume," the $BiCl_3$ tracer concentration need only be 0.676% by volume.

Based on Examples 1–5, it is possible to estimate the level of concentrations achievable by increasing the signal-to-noise ratio ($S/N$) of the equipment over that used therein.

For the $Bi^{209}$ nucleus in $BiCl_3$ embedded within the epoxy material of Examples 1–3, a tracer concentration of 30% by volume was selected in order to insure an adequate response with the low-level RF oscillator of 0.1-volt sensitivity. The resulting signal-to-noise ratio was 4/1.

The oscillator sensitivity can be substantially increased by enhancing the nuclear relaxation and increasing the RF level to possibly 100 volts. The $S/N$ ratio would thereby be increased, correspondingly, 1000-fold to 4000/1. Alternatively, by increasing the input signal, correspondingly, fewer nuclei may be employed to produce the same RF absorption response.

The fraction of the incident energy that is absorbed is given:

$$\frac{\Delta E}{S} = N_v \cdot e_n$$

where $\Delta E$ is the amplitude of the absorption band; $N_v$ is the number of NQR-sensitive nuclei within the "probe volume"; $e_n$ is the fraction of the incident energy absorbed per nucleus; and S is the strength of the RF signal input. Then $$\frac{\Delta E}{N} = \frac{N_v e_n S}{N}$$

where N is the noise level, considered essentially a constant for the system. By increasing the signal-to-noise ratio ($S/N$), it is seen that the number of NQR-sensitive nuclei within the sample ($N_v$) may be correspondingly decreased without influencing the RF absorption response ($\Delta E/N$).

Consider the case for an $S/N$ value of 400/1 i.e., 100 times that used in Examples 1–3. The required concentration of of $BiCl_3$ would then be reduced from 30% to $(30/100)\% = 0.3\%$ by volume.

This value is less than that calculated above (except for "probe volumes" substantially greater than two cubic inches) based on the minimum number of NQR-sensitive nuclei required. Thus it is seen that the instrumental equipment need not be a limiting factor with respect to required tracer concentration. The following additional examples will then manifest themselves:

Example 6

A plastic member may be prepared in accordance with Example 3 using from about 0.3% to 30% by volume of the $BiCl_3$. This member may then be subjected simultaneously to tensile stress in accordance with the steps of Example 1 and to changes in temperature in accordance with the steps in Example 3. The coil 52 may then be employed to obtain two different NQR responses which can be measured simultaneously. The change in band width or amplitude of the NQR response absorption band may be recorded to determine stress and the NQR resonance frequency may be recorded to determine temperature.

Figure 10:
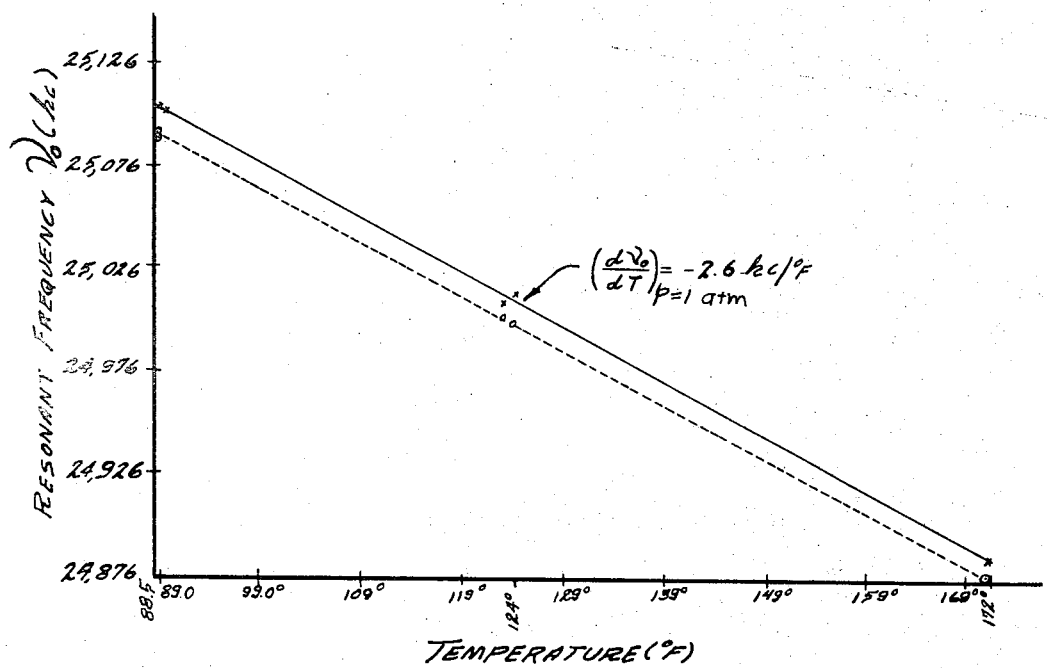
Figure 11:
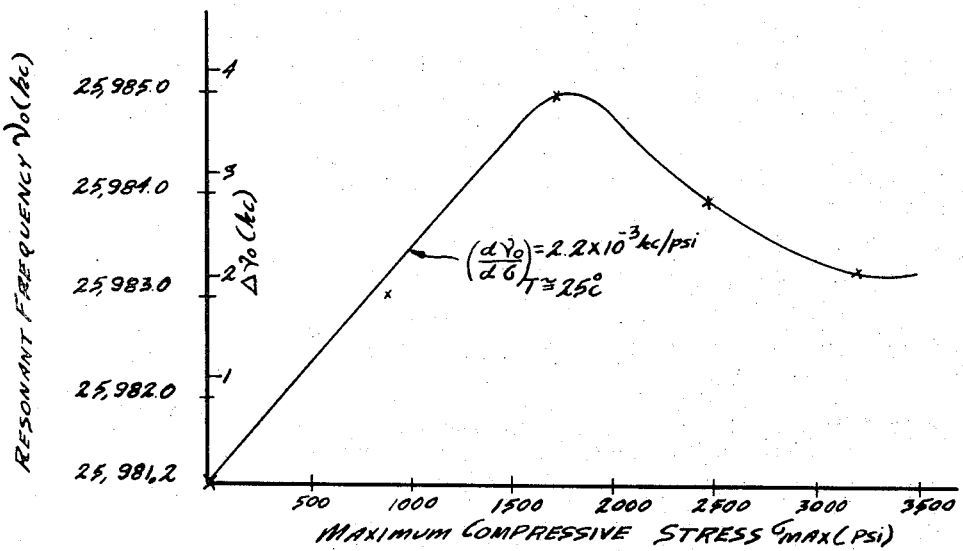

The temperature and stress levels may then be read directly from the previously calibrated response curves shown in FIGURES 8 and 10.

Example 7

A structural member may be prepared by mixing approximately 98% by volume of the aforementioned epoxy plastic with 1% by volume of a $Cu_2O$ tracer and approximately 1% by volume of a $BiCl_3$ tracer. The mixture may then be cast into the form of a rod and allowed to gel as in the previous examples. Resonance frequencies may be measured for each tracer at various locations under various conditions of stress and temperature.

From the resonant frequency ($\gamma$) measured at each location for each of the two tracers, the temperature (T) and stress ($\sigma$) at that location can be directly calculated, using the general relationship shown below in Equation 2, which is based upon the fact that $$\gamma = f(T, \sigma) \quad (1)$$

$$d\gamma = \left(\frac{d\gamma}{d\sigma}\right) d\sigma + \left(\frac{d\gamma}{dT}\right) dT \quad (2)$$

For the case where $(d\gamma/d\sigma)$ is a constant $= K_1$ and $(d\gamma/dT)$ is a constant $= K_2$ (as, for example, is the case for $Cu_2O$ from FIGURES 11 and 12), the resonant frequency shift for each tracer is:

$$\Delta\gamma^{(1)} = \gamma^{(1)} - \gamma_0^{(1)} = K_1^{(1)}(\sigma - \sigma_0) + K_2^{(1)}(T - T_0) \quad (3)$$

$$\Delta\gamma^{(2)} = \gamma^{(2)} - \gamma_0^{(2)} = K_1^{(2)}(\sigma - \sigma_0) + K_2^{(2)}(T - T_0) \quad (4)$$

where the superscripts (1) and (2) refer to the tracer; and $\gamma_0$ is the resonant frequency at $\sigma_0$ and $T_0$, taken as the same values for both tracers. $\gamma_0^{(1)}$ and $\gamma_0^{(2)}$, and the K values are characteristic of the tracers, and are all known. Since the stress and temperature are the same for both tracers, no distinction is made.

$$\sigma = \frac{1}{K_1^{(1)}} \gamma^{(1)} - \frac{\gamma_0^{(1)}}{K_1^{(1)}} + \sigma_0 - \frac{K_2^{(1)}}{K_1^{(1)}} T + \frac{K_2^{(1)}}{K_1^{(1)}} T_0 \quad (3A)$$

$$\sigma = \frac{1}{K_1^{(2)}} \gamma^{(2)} - \frac{\gamma_0^{(2)}}{K_1^{(2)}} + \sigma_0 - \frac{K_2^{(2)}}{K_1^{(2)}} T + \frac{K_2^{(2)}}{K_1^{(2)}} T_0 \quad (4A)$$

Equations 3A and 4A may be written:

$$\sigma = \frac{\gamma^{(1)}}{K_1^{(1)}} + C^{(1)} - \frac{K_2^{(1)}}{K_1^{(1)}} T \quad (3B)$$

$$\sigma = \frac{\gamma^{(2)}}{K_1^{(2)}} + C^{(2)} - \frac{K_2^{(2)}}{K_1^{(2)}} T \quad (4B)$$

where $$C^{(1)} = \sigma_0 - \frac{\gamma_0^{(1)}}{K_1^{(1)}} + \frac{K_2^{(1)}}{K_1^{(1)}} T_0$$

and $$C^{(2)} = \sigma_0 - \frac{\gamma_0^{(2)}}{K_1^{(2)}} + \frac{K_2^{(2)}}{K_1^{(2)}} T_0$$

Then Equations 3B and 4B may be readily solved for $\sigma$ and T by substituting the measured values of $\gamma^{(1)}$ and $\gamma^{(2)}$ and the values of the constants $C^{(1)}$ and $C^{(2)}$.

The NQR resonant frequency response may then be obtained for different states of loading and temperature and the appropriate relationships for these quantities substituted into Equation 2 so that solutions can be obtained.

Example 8

Figure 13:
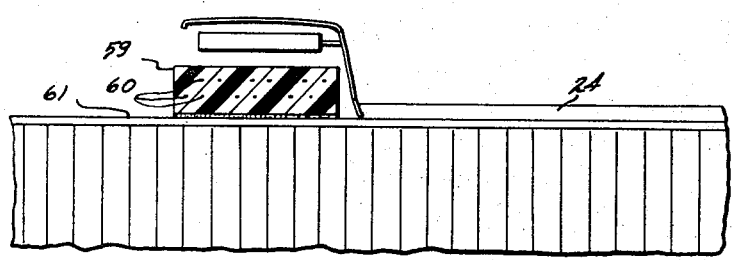
FIGURE 13 is an enlarged, cross-sectional view taken along line 13—13 of FIGURE 6.

A plastic material 59 may be prepared in accordance with Example 3 to include a tracer 60 and then bonded to the wing 61 of an aircraft 62, as shown in FIGURES 6 and 13, in a small area to be investigated. A probe 20 may be mounted on the wing 61 above the area to be investigated and connected through its lead 24 to an NQR spectrometer (not shown). The probe 20 may then be used to simultaneously monitor temperature and stress in accordance with the teaching of Example 6.

Example 9

The thickness of the wall of a nonmetallic structure, e.g., a filament-wound pressure vessel or a nozzle shell, can be measured in accordance with the present invention as follows:

The tracer would be uniformly dispersed through the material comprising the wall of the structure. By prior calibration measurements using this same composition and RF probe/instrumentation, the amplitude of the NQR absorption band at the resonant frequency would be known as a function of thickness. The energy absorption (amplitude of band) is directly proportional to the amount of tracer material present within the measured volume; and this volume is defined by the surface area covered by the probe and the wall thickness of the structure being measured. Thus, $$I\gamma = k_1 N_v A t = k_2 t$$

where $I\gamma$ is the amplitude of the absorption band at the resonant frequency, $N_v$ is the number of tracer particles per unit volume of the nonmetallic material (structure), A is surface area exposed and $t$ is the specimen thickness. $k_1$ is a proportionality constant for that tracer-nonmetallic system. When the tracer concentration ($N_v$) and exposed surface area (A, as defined by the probe) are held constant, then $k_1 N_v A$ can be replaced by the constant $k_2$; and $I\gamma$ is directly proportional to the wall thickness, $t$.

Thus, in practice, one would be able to read off the wall thickness directly from a calibration curve of $I\gamma$ vs. $t$ for that tracer-nonmetallic system and NQR probe.

For example, $Cu_2O$ could be uniformly dispersed through an epoxy resin-glass filament-wound reinforced-plastic composite structure. This might be accomplished by uniformly coating the glass fibers (or rovings) prior to winding, by incorporating the tracer within the resin, or by applying a known amount of tracer over a given area before each layer is wound. The amount of tracer to be used would depend on the available spectrometer—i.e., sensitivity and signal-to-noise ratio. For a very sensitive NQR spectrometer, less than 1% by volume of tracer would be adequate.

This amount would be particularly useful for measuring wall thickness of large structures or those in which the wall is not readily accessible for current conventional measuring apparatus, e.g., micrometers. This latter would include composite structures consisting of two or more layers of different materials, e.g. nozzles, heat shields, nose cones, and filament-wound pressure vessels.

It is also apparent that the number of layers (plies) of a reinforced plastic could also be determined in the same fashion. This would be particularly the case when the tracer is applied between layers.

Although the examples listed above suggest adding a separate tracer material to the structural member to be tested, it will be apparent to those skilled in the art that the step of adding a separate tracer material may be eliminated if the structural member to be tested already contains a suitable tracer as a part of its composition. For example, many adhesives, coatings, ablators, and insulations contain fillers and reinforcements which are sufficiently influenced by stress or temperature to permit NQR measurements. Aluminum oxide, antimony trioxide, as well as various boron and beryllium compounds are typical of such ingredients and are known to provide NQR responses. Halogen atoms, especially chlorine, are present in many polymeric materials and a wide variety of such compounds are sensitive to NQR.

Since NQR measurements are specific to atomic nuclei in suitable molecular environments, it may be possible to actually develop polymeric materials containing such species as part of the molecular structure. For example, a number of nitrogen-containing compounds are known to be receptive to NQR. These may serve as curatives for epoxy resins, thereby making their tracer become an integral part of the polymer.

Catalysts used during the curing of plastics constitute a source of contaminants. Up to 1% of tertiary amines (e.g. benzyldimethylamine) are often used as cure promoters in conjunction with acid anhydride curing agents for epoxy resin plastics. Lewis acid salts are often used as the curing agents, e.g. $BF_3$-monoethylamine. These materials, in effect, remain in the cured resin as contaminants at the concentration level introduced. As noted in the above examples, approximately 1% of a tracer material may be employed in accordance with the method of the present invention. Therefore, the contaminants appear to exist in sufficient concentration to constitute suitable tracers for practicing the method of the present invention.

A criteria for application of the NQR method is that the structure be RF transparent, i.e., nonmetallic. Metallic materials may be present provided they do not interfere excessively with the RF field. For example, a metallic substrate was used in some of the examples. Further a metallic substrate or other surface (provided RF is not shielded out) could act as an internal reflector of the RF energy, thereby making a given signal more effective.

While the particular composition of matter, apparatus, and method herein shown and described in detail are fully capable of attaining the objects and providing the advantages hereinbefore stated, it is to be understood that they are merely illustrative of the presently preferred embodiments of the invention and that no limitations are intended to the details of construction, design, or method steps herein shown and described other than as defined in the appended claims.

What is claimed is:

1. The method of determining stress and temperature profiles in a body of non-conductive material having therein a first tracer in at least that region at which stress and temperature profiles are desired, said first tracer exhibiting changes in nuclear conditions in response to temperature changes and being capable of absorbing radio-frequency energy, and a second tracer in said region exhibiting changes in nuclear conditions in response to stress changes and being capable of absorbing radio-frequency energy, comprising the steps of: simultaneously measuring the nuclear quadrupole resonant frequency of each of said tracers at a point in said region, and similarly measuring said frequencies at at least one other point in said region to establish temperature and stress profiles; and correlating said profiles to determine therefrom the stresses in said region due to temperature gradients therein, due to residual stresses, and due to external loading.

2. The method of claim 1 wherein said tracers include nuclei having a nuclear spin greater than 3/2, nuclear magnetic moments and nuclear quadrupole moments, said body of non-conductive material having a noncubic electric field environment at the site of said tracers.

3. The method of determining stress and temperature profiles in a body of non-conductive material having a tracer therein in the region to be examined, said tracer having a first observable nuclear quadrupole resonance response to temperature changes and a second nuclear quadrupole resonance response to stress changes, comprising the steps of: simultaneously measuring the nuclear quadrupole resonant frequency of said tracer at a point in said region, and similarly measuring said frequencies at at least one other point in said region to establish temperature and stress profiles; and correlating said profiles to determine therefrom the stresses in said region due to temperature gradients therein, due to residual stresses, and due to external loading.

4. The method of claim 3 wherein said tracer includes nuclei having a nuclear spin greater than 3/2, nuclear magnetic moments and nuclear quadrupole moments, said body of non-conductive material having a noncubic electric field environment at the site of said tracer.

5. The method of determining stress and temperature profiles in a body of non-conductive material having therein a single tracer, in a region to be examined, said tracer being sensitive to temperature in such a manner trat a nuclear quadrupole resonance frequency shifts significantly with temperature change while remaining relatively unaffected by applied stress, said tracer also being sensitive to applied stress in such manner that the band width of the nuclear quadrupole resonance response absorption band is strongly dependent upon stress levels, comprising the steps of: simultaneously measuring the nuclear quadrupole resonance frequency and the corresponding width of said band at a point in said region, and similarly measuring said frequency and band width at at least one other point in said region to establish temperature and stress profiles; and correlating said profiles to determine therefrom the stresses in said region due to temperature gradients therein, due to residual stresses, and due to external loading.

6. The method of claim 5 wherein said tracer includes nuclei having a nuclear spin greater than 3/2, nuclear magnetic moments and nuclear quadrupole moments, said body of non-conductive material having a noncubic electric field environment at the site of said tracer.

7. In combination with a structural member containing nuclei which have a first predetermined nuclear quadrupole resonance response to stress and a second predetermined nuclear quadrupole resonance response to temperature; apparatus for measuring the stresses in said structural member, comprising, a nuclear quadruple resonance, said probe including a coil adjacent said member and an R-F reflective mirror carried by said probe superjacent said coil for reflecting and concentrating R-F power in said structural member; and a nuclear quadrupole resonance spectrometer connected to said probe for measuring the nuclear quadrupole resonance frequency of said nuclei, and means mounting said probe on said structural member.

References Cited

Baer et al.—Journal of Chemical Physics: vol. 31, No. 6, December 1959, pp. 1690 and 1691.

Bendek et al.—Physical Review: vol. 118, No. 1, April 1, 1960, pp. 46–57 incl.

Bendek et al.—Review of Scientific Instruments: vol. 28, No. 2, February 1957, pp. 92–95 incl.

Kushida et al.—Physical Review: vol. 104, No. 5, Dec. 1, 1956, pp. 1364 to 1369 principally relied on.

Shulman et al.—Physical Review: vol. 107, No. 4, Aug. 15, 1957 pp. 953 to 956 relied on.

Solov'ev et al.—Instruments and Experimental Techniques: 1962 No. 2, pp. 332 to 335 incl. Copy in Group 220 of Patent Office 324—0.5.

RUDOLPH V. ROLINEC, *Primary Examiner.*

M. J. LYNCH, *Assistant Examiner.*